UNITED STATES PATENT OFFICE 2,464,219

PLASTIC COMPOSITION OF A POLYVINYL CHLORIDE RESIN AND AN ASPHALTIC MATERIAL

Philip C. Doyle, Rocky River, and Kenneth H. Rudd, Cleveland Heights, Ohio, assignors to The Standard Oil Company, Cleveland, Ohio, a corporation of Ohio No Drawing. Application December 20, 1945, Serial No. 636,273

11 Claims. (Cl. 260—28.5)

This invention relates to a novel homogeneous composition of matter comprising a polyvinyl resin and a particular asphaltic-like material, as the principal plastic ingredients.

The polyvinyl resins have many unique properties which adapt them for uses to which many other plastics are not suitable. The polyvinyl resins are also much more expensive than many other types of molding plastics. While their higher price justifies their use for many special purposes to which their unique properties adapt them, they are not competitive with many other plastics which cost about half as much.

The polyvinyl resins also are unique in that they do not blend readily with materials such as oils, fats, waxes, gums, and these materials are referred to as being "incompatible." One leading manufacturer states in his descriptive catalogue that "This means that, by and large, these resins cannot be used to fortify other types of finishes to improve their properties, but must be handled by themselves according to their own special technology." Their incompatibility, as described above, has rendered it difficult to compound them so as to reduce the cost of the compounded composition. If a very low cost material could be found which was fully compatible with the polyvinyl resins and which could be blended in a relatively large amount so as to retain the unique properties of these resins in the blend, the resulting composition would be competitive with the more inexpensive plastics.

One such material that is incompatible with the polyvinyl resins is ordinary asphalt. This has been found not to be compatible in an amount of more than about 15%. Investigation showed that the incompatibility of these resins with asphalt in a large amount was recognized in the literature.

Considerable work has been done on materials from petroleum origin, particularly of an asphaltic nature, in an effort to find a low cost material which will fill this long felt need in this art. Contrary to what might have been expected from these known characteristics of polyvinyl resins and asphalt, it has been discovered that a particular type of asphaltic-like material is compatible with polyvinyl resins, and that the blend possesses a maximum of the desirable properties of the polyvinyl resins and a minimum of the less desirable properties of the particular asphaltic-like material from the viewpoint of a plastic composition. This blending of polyvinyl resins with the particular asphaltic-like material may be viewed as upgrading this asphaltic-like material to an extent that the blended material exhibits excellent qualities as a composition for coating purposes and molding, including extrusion and injection molding.

The two ingredients can be blended in substantially all proportions. Any amount of the asphaltic-like material can be added to the resin because of the compatibility, but generally the amount will be at least 25% (by weight) based on the total composition, since amounts this high produce compositions retaining to a surprising degree the desirable properties of the polyvinyl resin and also result in the desired economies. When even a few per cent, such as 5% of the resin is added to the asphaltic-like material, its properties as a molding plastic are improved to an extent entirely out of proportion to the amount of the polymer resin. While considerations of operability do not impose limitations on the proportions, practical considerations suggest that the economic range will be 25 to 95% of the asphaltic-like material to 75 to 5% of the polymer.

Polyvinyl resins with which we have worked most extensively are chloride-acetate copolymers made by copolymerizing vinyl chloride and vinyl acetate. Vinyl chloride containing polymers are well known in the art.

Copolymers which are commercially available and which have been used are identified as follows:

| Resin | Per Cent Vinyl Chloride | Average Molecular Weight |
|---|---|---|
| Copolymer No. 1 "Vinylite" VYNH | 85–88 | 10,000 |
| Copolymer No. 2 "Vinylite" VYNS | 88.5–90.5 | 16,000 |
| Copolymer No. 3 "Vinylite" VYNW | 93–95 | 24,000 |
| Copolymer No. 4 "Vinylite" VYNU | 93–95 | 24,000 |
| Copolymer No. 5 "Vinylite" VYNV | 93–95 | 24,000 |

In general they are very tough and rigid and are usually plasticized. They can be internally plasticized by copolymerizing certain other unsaturated monomers therewith. The vinyl chloride in such a copolymer imparts the toughness and strength and the vinyl acetate imparts certain solubility properties. The proportion varies, depending on the properties wanted in the copolymer, but in general, about 8 to 9.5 mols of vinyl chloride is copolymerized with 2 to 0.5 mols of vinyl acetate. A preferred ratio is in the neighborhood of 9 mols of the chloride to 1 mol of the acetate. These copolymers are known in the trade merely as "copolymer resins" and will be referred to as such. Any other similar vinyl chloride-acetate copolymer can be used in practicing the invention. They are available in many forms, including solids in a pulverized condition.

Another copolymer is 8 to 9.5 mols of vinyl chloride copolymerized with 2 to 0.5 mols of vinylidine chloride.

This invention is applicable to polyvinyl chloride per se or vinyl chloride copolymerized with less than 50% of a modifying monomer, preferably less than 25%. "Polyvinyl chloride resin" as used herein refers to polyvinyl chloride per se, externally plasticized, or internally plasticized by copolymerizing with another monomer but in which the vinyl chloride comprises the major portion of the resin, and in which the properties of the resin are primarily the characteristics imparted by polyvinyl chloride.

This invention is especially adapted for use in connection with the "copolymer resins." They are commercially available and will be described hereinafter as applied to them merely for illustrative purposes.

The particular asphaltic-like material used in accordance with the invention must have a specified composition to be suitable. Asphalt is a term used to define a wide variety of different compositions from a wide variety of sources. Even as applied to material of petroleum origin, it varies with the method of processing the crude. It is necessary to explain in some detail just what comprises the asphaltic-like material that may be used in the composition of the invention and how it may be made.

Asphalt, tars, and similar materials are difficult to define in terms of them chemical composition and their components are often difficult to identify chemically. While many components have been identified in asphaltic materials, for practical purposes such components may be grouped as (1) asphaltenes, (2) resins, (3) oils, and (4) waxes. An analytical method for separating asphaltic material into these fractions is described in an article by Francis R. Grant and Arnold J. Hoiberg, entitled "Practical laboratory method of analyzing for the constituents of asphalt," published in the December, 1940, issue of the "Proceedings of the Association of Asphalt Paving Technologists," pages 87–122, and refered to herein as the "Hoiberg Analysis." The components referred to in describing the invention are separated or determined in accordance with the procedure in this article.

One such particular asphaltic-like material which is admirably suited for practicing the invention, and which is disclosed merely as illustrative, is known as "wax tailings." It is made by the dry distillation of petroleum or any petroleum residue and is the last fraction to be distilled over from the still before coke is formed in the still. Abraham's "Asphalts and Allied Substances," fifth edition, defines wax tailings as follows:

"This represents the fraction obtained in the dry distillation of petroleums, and recovered immediately prior to coking. It is peculiar in its properties and generally free from paraffin wax."

In order words, wax tailings is the last fraction to be distilled over before the still residue turns to coke. It is easily recognized by its yellow color and can be readily distinguished from fractions which distill over before the wax tailings. Abraham states that "Wax tailings is sometimes termed 'still wax,' although both these names are misnomers, since it contains only small quantities of paraffin wax." Wax tailings consist generally of decomposition or cracked products "and has a decided yellow color, by which it is recognized during the process of distillation. Upon cooling it forms a very viscous semi-liquid to sticky semi-solid of a characteristic light yellow to yellowish brown color." (Abraham.)

If desired, the wax tailings can be reduced with steam to eliminate the more volatile components as is well understood in the art. The wax tailings also can be blown with air so as to cause a condensation which raises the softening point of the wax tailings. By such air blowing the penetration can be reduced down to zero and the melting point correspondingly increased. During this air blowing there is a tendency for the amount of asphaltenes to increase, and the amount of resins, oils and waxes to decrease. Such blown products are referred to as "oxidized."

As illustrative of properties of wax tailings made at refineries at Lima, Ohio, and Toledo, Ohio, the following table is included:

| Type of Material | Steam Wax Tailings (Lima) | Steam Reduced and Oxidized Wax Tailings (Lima) | Steam Reduced Wax Tailings (56.5% Toledo and 43.5% Lima) |
|---|---|---|---|
| Sample Number | 3 | 4 | 3A |
| Softening Point (R & B) °F | 118 | 154 | 156 |
| Penetration at 77° F. (100 g., 5 sec.) | 48 | 1 | 34 |
| Specific Gravity at 77° F | 1.118 | 1.134 | 1.144 |

HOIBERG ANALYSIS

| | Per cent | Per cent | Per cent |
|---|---|---|---|
| Asphaltenes | 33.00 | 49.04 | 48.74 |
| Resins | 5.55 | 2.16 | 2.48 |
| Oils | 50.03 | 37.28 | 40.49 |
| Wax | 11.16 | 11.50 | 8.28 |

Other samples of wax tailings may be used as will appear from the examples hereinafter.

Another type of asphaltic-like material that may be used in the composition of the invention is a residuum from the thermal cracking of a petroleum fraction. Generally it is obtained by one of a variety of processes for thermally cracking petroleum distillate and other fractions. (Thermal cracking is to be distinguished from catalytic cracking since the latter does not form an asphaltic-like residuum.)

The temperature, time of cracking and pressure are interrelated to produce a heavy residuum as is well known in the art. In liquid phase cracking, the temperatures are about 800 to 1100° F., with pressures of 500 to 1500 pounds per square inch or even higher. In vapor phase cracking higher temperatures and lower pressures are used for a shorter time. Whether the hydrocarbon is in the liquid or vapor phase, or a part in each, depends also on the boiling point and range of the cracking stock.

When a distillate is used as the charging stock for the cracking, all of the heavy residuum results from the cracking of the lighter components of the gas oil. If the charging stock is a whole crude or a reduced crude, a portion of the components of the charging stock may go through the cracking process unaffected if the temperature and pressure condition are not sufficiently severe, and thus accumulate in the residuum. These usually must be in a minor proportion if the residuum has the designated composition. In the case of the gas oils and light fractions, the cracking can be less severe.

It is desirable to remove as much of the volatile products from the cracked residuum as possible. To this end it may be reduced with steam in the conventional manner. The residuum so treated is referred to as "reduced." The residuum also may be blown with air and the product so treated is referred to as "oxidized."

The extent to which the volatile components are removed from the wax tailings or the cracked residuum and the extent to which the penetration is raised by blowing, does not materially affect the compatibility of the asphaltic-like material, but it does affect the temperature to which the blend can be subjected before softening.

As illustrative, a cracked residuum can be made by thermally cracking a gas oil that is obtained from the fractionating of a reduced crude in a pipe still. Cracked lighter products, such as gasoline, are removed and a heavy residue remains, which is known as "cracking coil tar" or "cracked residuum." This may be steam reduced and/or blown with air.

As a further illustration, a light catalytic gas oil may be thermally cracked and the remaining cracked residuum steam reduced and oxidized. The catalytic gas oil referred to is an overhead fraction boiling above gasoline obtained from a catalytic cracking process.

As still a further example, wax tailings and cracked residuum may be mixed together in any proportions. The components of such a mixture may be reduced and/or oxidized separately, or the mixture may be reduced and/or oxidized. In the following table detailed information is given as to the above examples:

| Type of Material | Steam Reduced Cracked Residuim from the Thermal Cracking of Pipe Still Gas Oil | Reduced and Oxidized Cracked Residuim from the Thermal Cracking of Light Catalytic Gas Oil | Oxidized Mixture of Wax Tailings and Cracked Residium (50% Sample No. 1 and 50% Sample No. 3) |
|---|---|---|---|
| Sample Number | 1 | 7 | 5 |
| Softening Point (R & B) °F | 116 | 148 | 160 |
| Penetration at 77° F. (100 g., 5 sec.) | 55 | 8 | 2 |
| Specific Gravity at 77° F | 1.114 | 1.133 | 1.142 |

HOIBERG ANALYSIS

| | Per cent | Per cent | Per cent |
|---|---|---|---|
| Asphaltenes | 35.73 | 47.99 | 57.48 |
| Resins | 5.59 | 2.16 | 0.316 |
| Oils | 55.75 | 47.00 | 33.17 |
| Wax | 2.93 | 2.83 | 9.02 |

The above three are merely illustrative and other samples having lower and higher softening points can be used as will appear from the examples hereinafter.

The particular asphaltic-like materials that may be used in accordance with the invention are to be distinguished from ordinary asphalts which are incompatible with vinyl resins. In one such method of making an ordinary asphalt, crude petroleum, such as an asphalt or mixed base crude, is distilled to remove the components that are more readily volatile at atmospheric pressure, including naphthas, such as gasoline, kerosene, and higher fractions. The portion of the crude remaining after such distillation is referred to as a "reduced crude." It is common to fractionate the reduced crude at a high temperature (500 to 800° F.) at a high vacuum (10 to 45 mm. Hg absolute). A plurality of distillate fractions are obtained. They may be, for example: "gas oils" which are often used as cracking stocks; "paraffin distillate," which contains lubricating oil base and wax, and from which good lubricating oil can be made by removing the wax; "wax slops," also used as a cracking stock; and "cylinder stock," from which lubricating oil bases and ingredients can be derived.

The material that remains unvaporized, even under the high temperature and low pressure, is properly referred to as "pipe still bottoms." It is also sometimes referred to as a type of asphalt. This material contains the non-volatile components of the crude and is relatively low is asphaltenes and high in resins.

When the pipe still bottoms are "oxidized," such as by blowing with air, a condensation or polymerization takes place and the product becomes harder and is more correctly referred to in the trade as "asphalt." The bottoms may also be hardened and further reduced by blowing with steam. This is typical of the asphalt which the prior art recognizes as not compatible with polyvinyl resins.

Such oxidized pipe still bottoms which comprise ordinary asphalt are described in the following table:

| Type of Material | Oxidized Pipe Still Bottoms | Oxidized Pipe Still Bottoms | Oxidized Pipe Still Bottoms |
|---|---|---|---|
| Sample Number | A | B | C |
| Softening Point (R & B) °F | 119 | 119 | 116 |
| Penetration at 77° F. (100 g., 5 sec.) | 98 | 91 | 91 |
| Specific Gravity at 77° F | 0.992 | 1.005 | 1.028 |

HOIBERG ANALYSIS

| | Per cent | Per cent | Per cent |
|---|---|---|---|
| Asphaltenes | 20.70 | 22.94 | 28.83 |
| Resins | 52.03 | 46.67 | 32.31 |
| Oils | 9.40 | 14.03 | 21.89 |
| Wax | 18.87 | 16.36 | 16.97 |

From the above considerations it will be seen that the particular asphaltic-like material that may be used in accordance with the invention, is quite different from oxidized pipe still bottoms or ordinary asphalt. The asphaltic-like material which may be used in accordance with the invention has a relatively high specific gravity, and to be used in accordance with the invention should have a specific gravity preferably of above 1.100.

Another characteristic which distinguishes the asphaltic-like material used in the invention is a relatively high amount of asphaltenes and the very low amount of resins. In accordance with the invention the asphaltic-like material used should comprise at least 25% asphaltenes and not more than 25% resins based on the amount of the asphaltenes, the balance being oil and waxes. Generally there will be at least about 25% oils and waxes in such an asphaltic-like material.

The composition of the invention can include a plasticizer, which increases the flexibility, impact strength, and permits the material to be worked at lower temperatures. Any plasticizer may be used which is compatible with copolymer resins; the nature of these is well understood in the art. Particularly satisfactory plasticizers are those of the ester type, such as di-octyl phthalate, di-butyl phthalate, di-butyl sebacate, tri-cresyl phosphate, methyl abietate, triphenyl phosphate and similar esters. Chlorinated esters, aromatic ethers and ketones also may be employed, as is well understood. The amount of the plasticizer used is that required to obtain the necessary plasticity and may vary within the extremes of 0 to 30%; the preferred range being about 1 to 8%.

The composition of the invention can also be used with an inert filler which may vary in proportions, depending upon the particular article to be molded. In general, this may vary from about 0 to 60%. Any inert filler may be used, as is well understood in the plastic molding art, such fillers including, for instance, calcium silicate, talc, slate dust, magnesia, carbon black, precipitated carbon, air blown chalk, fly ash, mineral flour, lignin, wood flour, clay, asbestos, cotton fiber or other organic or mineral fibrous material. Other auxiliary agents may be used, such as calcium stearate and zinc stearate.

The blends of vinyl resins and the various asphaltic-like materials described heretofore can be used for a variety of purposes. They are not all identical, however, and some are preferred for different uses. For example, vinyl resins comprising wax tailings are preferred for injection or extrusion molding. Vinyl resins comprising the cracked residuum remaining from the thermal cracking of a catalytic gas oil are particularly adapted for the manufacture of phonograph records. The vinyl resin comprising cracked residuum from the thermal cracking of pipe still gas oil is particularly adapted for coatings such as cans, bottle tops, beer kegs, etc.

The following examples are given merely as illustrative:

Example 1

Fifty parts of wax tailings having a Softening Point of 110° F. was blended with 50 parts of a polyvinyl chloride-acetate copolymer resin heretofore identified as Copolymer No. 4. The resulting product was tested for impact, flexure, tensile strength, and distortion temperature.

In the impact test, a disc of the plastic 2" in diameter and ⅜" thick is supported on the flat surface and a pin having a spherical end 1 cm. in diameter is placed in the center of the disc. A 2 kg. weight is raised in increments of 10 cms. and dropped on the pin. This plastic required 6 drops of the weight, the last one from the height of 60 cm., to break the disc.

The flexure test is similar to the Standard A. S. T. M. test, in which a rod ½" square and 5" long is supported ½" from each end, and the load applied in the center of the rod at 77° F. at a rate of 1.8 inches per minute. The rod of this plastic broke at 9,220 pounds per square inch.

The tensile strength is a standard test and was measured on a rod of the plastic 5" long and 1" square in the middle of which has been milled a section ¼" in diameter and 1" long, and a force of 1,560 pounds per square inch was required to break the rod.

The distortion temperature is a standard A. S. T. M. test in which a bar ½" square is supported near its end and a weight placed in the center. The temperature is raised at a regulated rate and the temperature at which the bar bends is the distortion temperature. This plastic had a distortion temperature of 127° F.

Example II

Fifty parts of wax tailings blown to have a softening point of 140° F. was blended with 50 parts of a polyvinyl chloride-acetate copolymer resin heretofore identified as Copolymer No. 4. This product resisted an impact of 75 cm. It had a tensile strength of 2,640 pounds per square inch, a flexure of 7,580 pounds per square inch and a distortion temperature of 144° F.

As compared with Example I, it will be noted that a higher distortion temperature is obtained by flowing the wax tailings to a higher melting point before blending with the same copolymer resin in the same amount. This distortion temperature is entirely acceptable for plastics of this type, and the lower temperature is suitable for certain purposes.

Example III

Fifty parts of wax tailings blown to have a softening point of 145° F. was blended with 50 parts of a polyvinyl chloride-acetate copolymer resin heretofore identified as Copolymer No. 4. This composition resisted an impact of 45 cm. It had a tensile strength of 3,090 pounds per square inch, a flexure of 8,640 pounds per square inch and a distortion temperature of 145° F. The increased tensile strength and distortion temperature is noted from the use of wax tailings having a higher softening point than in Example II. The decreased impact is understandably reduced because of the higher melting point of the materials. This composition could be plasticized with any of the plasticizers heretofore mentioned to materially increase the impact test if this property is desirable.

Example IV

Fifty parts of a polyvinyl chloride-acetate copolymer resin heretofore identified as Copolymer No. 4 is blended with 40.9 parts of wax tailings having a softening point of 110° F., and 9.1 parts of chrome yellow pigment. This composition resisted an impact of 45 cm., had a tensile strength of 3,080 pounds per square inch, a flexure of 9,300 pounds per square inch and a distortion temperature of 135° F. As compared with Example I, this example shows the desirable effects of a pigment on all of the properties except impact.

Example V

Forty-five parts of wax tailings blown to have a softening point of 154° F. (sample #4) and 55 parts of a polyvinyl chloride-acetate copolymer resin heretofore identified as Copolymer No. 5 was blended and tested. The composition had a tensile strength of 3,020 pounds per square inch and a flexure of 11,900 pounds per square inch. The distortion temperature was 144° F. The impact was not determined.

Example VI

Wax tailings having a softening point of 118° F. (sample #3) in an amount of 34.6 parts was blended with 42.3 parts of a polyvinyl chloride-acetate copolymer resin heretofore identified as Copolymer No. 5, together with 7.7 parts of di-octyl phthalate, 7.7 parts of di-butyl sebacate and 7.7 parts of pigment. The composition was examined carefully and found to have desirable properties suiting it for a variety of molding purposes, but the specific tests were not run on this sample.

Example VII

Reduced cracking coil tar is oxidized by blowing air through it until it attains a softening point of 182° F. It is blended with a polyvinyl chloride-acetate copolymer resin heretofore identified as Copolymer No. 4 in the proportions of 44.5% of the asphaltic-like material and 54.5% of the copolymer resin. About 1% of di-octyl phthalate was added as a plasticizer which greatly reduced the tendency toward brittleness, and increased the toughness and tensile strength of the molded product without lowering the distortion temperature. The product resisted an impact of 60 cm. It had a tensile strength of 3,200 pounds per square inch, a flexure of 10,850 pounds per square inch and a distortion temperature of 140° F. This example shows that the cracked residuum gives a plastic having similar properties, except that it is black and not so adapted for coloring. It is entirely suitable for many purposes, such as phonograph records.

*Example VIII*

A composition was made comprising 49.5 parts of a commercial polyvinyl-chloride-acetate copolymer resin heretofore identified as Copolymer No. 2, 33.1% of a highly cracked asphaltic-like residuum having a penetration of 52 A. S. T. M., 5% of di-butyl phthalate, and 12.4 parts of wood fiber. The resulting composition resisted an impact of 100+ cm. It has a tensile strength of 2,510 pounds per square inch, a flexure of 10,280 pounds per square inch and a distortion temperature of 102° F. The relatively lower distortion temperature may be attributed in part to an asphaltic-like material of relatively lower softening point or higher penetration and the presence of a relatively large amount of plasticizer. This material is suitable for many purposes where a high distortion temperature is not required.

*Example IX*

Fifty parts of a polyvinyl chloride-acetate copolymer resin heretofore identified as Copolymer No. 3 was blended with 20 parts of a reduced cracking coil tar blown to a softening point of 180° F., together with 20 parts of wax tailings having a softening point of 115° F. and 10 parts of chrome yellow pigment. The composition resisted an impact of 65 cm. It had a tensile strength of 2,770 pounds per square inch and a flexure of 10,000 pounds per square inch. The distortion was 144° F.

*Example X*

Fifty parts of a polyvinyl chloride-acetate copolymer resin heretofore identified as Copolymer No. 5 was blended with 36 parts of the residuum formed by reducing cracking coil tar and blowing it to a softening point of 210° F., together with 9 parts of wax tailings having a softening point of 118° F. The resulting plastic had a tensile strength of 3,800 pounds per square inch, a flexure of 11,420 pounds per square inch, and a distortion temperature of 140° F. The impact was not determined.

*Example XI*

Fifty-five parts of a polyvinyl chloride-acetate copolymer resin heretofore identified as Copolymer No. 5, 22.5 parts of wax tailings blown to a softening point of 154° F., and 22.5 parts of a blown cracking coil tar having a softening point of 210° F., was blended into a plastic which had a tensile strength of 2,040 pounds per square inch, a flexure of 8,550 pounds per square inch, and a distortion temperature of 149° F.

It will be apparent from the above examples that the exact properties wanted in the plastic can be obtained by varying the proportions of the various ingredients and by selecting those having characteristics which contribute to the properties wanted in the composition. It will also be apparent that the invention includes a variety of ingredients within the limitations specified heretofore, and that they may be compounded and processed in a variety of ways. All such variations are intended to be included within the invention as fall within the scope of the following claims.

We claim:

1. A molding composition, the plastic ingredients of which comprise a polyvinyl chloride resin and an asphaltic material comprising at least 25% asphaltenes, not over 25% resins based on the asphaltenes, and at least 25% oils and waxes.

2. A molding composition, the plastic ingredients of which comprise a polyvinyl chloride resin and wax tailings.

3. A molding composition, the plastic ingredients of which comprise a polyvinyl chloride resin, wax tailings, and a cracked residuum comprising a major portion of components resulting from the thermal cracking of a petroleum fraction.

4. A molding composition, the plastic ingredients of which comprise a polyvinyl chloride-acetate copolymer resin and an asphaltic material comprising at least 25% asphaltenes, not over 25% resins based on the asphaltenes, and at least 25% oils and waxes.

5. A molding composition, the plastic ingredients of which comprise a polyvinyl chloride-acetate copolymer resin, and wax tailings.

6. A molding composition, the plastic ingredients of which comprise a polyvinyl chloride-acetate copolymer resin, wax tailings, and a cracked residuum resulting from the thermal cracking of a catalytic gas oil.

7. A molding composition, the plastic ingredients of which comprise a polyvinyl chloride-acetate copolymer resin, wax tailings, and a cracked residuum comprising a major portion of components resulting from the thermal cracking of a petroleum distillate.

8. A molding composition comprising a polyvinyl chloride resin; an asphaltic material comprising at least 25% asphaltenes, not over 25% resins based on the asphaltenes, and at least 25% oils and waxes; and a plasticizer compatible with the resin.

9. A molding composition comprising a polyvinyl chloride resin; an asphaltic material comprising at least 25% asphaltenes, not over 25% resins based on the asphaltenes, and at least 25% oils and waxes; an inert filler; and a plasticizer compatible with the resin.

10. A molding composition comprising a polyvinyl chloride-acetate copolymer resin, wax tailings, and a plasticizer compatible with the resin.

11. A molding composition comprising equal parts by weight of a polyvinyl chloride-acetate copolymer resin, and wax tailings having a softening point above 115° F.

PHILIP C. DOYLE.
KENNETH H. RUDD.

REFERENCES CITED

The following references are of record in the file of this patent:

UNITED STATES PATENTS

| Number | Name | Date |
|---|---|---|
| 2,115,896 | Wiezevich | May 3, 1938 |